US000001277H

United States Statutory Invention Registration [19]

[11] Reg. Number: H1277

Tanaka

[43] Published: Jan. 4, 1994

[54] MODIFIED POLY(1-BUTENE)RESINS COMPOSITION

[75] Inventor: Haruhiko Tanaka, Yamaguchi, Japan

[73] Assignee: Shell Oil Company, Houston, Tex.

[21] Appl. No.: 757,385

[22] Filed: Sep. 10, 1991

[30] Foreign Application Priority Data

Sep. 14, 1990 [JP] Japan ..... 2-245008

[51] Int. Cl.[5] ..... C08L 29/04

[52] U.S. Cl. ..... 524/502

[58] Field of Search ..... 524/494; 525/240

[56] References Cited

U.S. PATENT DOCUMENTS 3,733,373 5/1973 McConnell et al. ..... 525/240

4,600,762 7/1986 Fukui et al. ..... 526/348.6

*Primary Examiner*—Robert L. Stoll

*Assistant Examiner*—Joseph D. Anthony

[57] ABSTRACT

A poly(1-butene) resin composition having and exhibiting excellent mechanical strength, rigidity, creep resistance and chloride water resistance is disclosed. The poly(1-butene) resin composition is particularly suitable as a material for joints pV in hot water pipes.

The poly(l -butene) resin composition comprises of from about 60 to 95 weight parts of a poly(l-butene) resins (A), from about 5 to 40 weight parts of glass fiber (B) and a modified propylenic resin (C) present in an amount of from about 0.1 to 10 weight parts based on the combined weight parts of (A) and (B).

17 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MODIFIED POLY(1-BUTENE)RESINS COMPOSITION

FIELD OF THE INVENTION

This invention generally relates to a poly(1-butene) resins composition. More particularly, this invention relates to a poly(1-butene) resin composition excellent in mechanical strength, rigidity, creep resistance and chlorine water resistance.

BACKGROUND OF THE INVENTION

Poly(1-butene) resins are excellent in heat resistance, creep resistance, stress cracking resistance, flexibility and the like, and thus are used for pipes for hot water. The joining of a pipe for hot water made of this poly(1-butene) resin to a joint is usually carried out by the heat fusing method, but a method is desired wherein the joining is carried out using a mechanical type joint whose attachment is easy. Nowadays, as for mechanical type joints, those made of a metal such as copper or brass are used. However, metal joints used in pipings for hot water supply are corroded with chlorine contained in city water, which becomes a large problem.

As an alternative to metal joints, joints made of polyacetal having high rigidity and excellent mechanical strength have also been used. These plastic-made joints are preferred over metal-made joints.

However, polyacetal hydrolyzes when it comes into contact with water of high temperature for a long term. Therefore, there is some concern that polyacetal-made joints may result in leakage of water and in an extreme case the breakage of the joints. Because of these deficiencies, alternate plastic materials that do not have these problems are desired.

It is known that mechanical joints for pipes are required to have high rigidity and mechanical strength and further be excellent in long-term heat creep resistance, hot water resistance and chlorine water resistance. Although poly(1-butene) resins satisfy this requirement, they are flexible resins and cannot be independently used as mechanical joints. Further, they lack affinity for glass fiber and when glass fiber is added as a reinforcing material, it is difficult to give sufficient rigidity and enhance the mechanical strength.

It is also known that mechanical joints are usually prepared by injection molding, and in order to enhance productivity in injection molding it is necessary to shorten molding cycle. However, the crystallization speed of poly(1-butene) resins is slow and it takes a long time for cooling in injection molding, and thus it has been difficult to enhance productivity.

SUMMARY OF THE INVENTION

It is an object of this invention to provide a poly(1-butene) resin composition excellent in mechanical strength, rigidity, creep resistance and chlorine water resistance and particularly suitable as a material for joints used in hot water pipes.

Accordingly, it is now provided a poly(1-butene) resin composition having excellent mechanical strength, rigidity, creep resistance, and chlorine water resistance comprising from about 60 to 95 weight parts of poly(1-butene) resin (A), about 5 to 40 weight parts of glass filler (B), and a modified propylenic resin (C), present in an amount of from about 0.1 to 10 weight parts based on the combined weight parts of (A) and (B). The inventive poly(1-butene) resin composition is particularly useful as a material for joints used in hot water pipes.

DETAILED DESCRIPTION OF THE INVENTION

The poly(1-butene) resin composition of this invention is detailedly described below.

The poly(1-butene) resin (A) contained in the composition of the invention is a homopolymer of 1-butene or a copolymer of 1-butene with another α-olefin having 2 to 20 carbon atoms. Examples of another α-olefin having 2 to 20 carbon atoms are ethylene, propylene, 4-methyl-1-pentene, 1-hexene, 1-octene, 1-decene, 1-tetradecene, 1-octadecene, etc. One or two or more of them can be contained in the poly(1-butene) resin. Further, when the poly(1-butene) resins contains another α-olefin, the α-olefin content is usually 20 mole % or less, preferably 10 mole % or less.

The melt flow rate of this poly(1-butene) resin is 0.01 to 50 g/10 min., preferably 0.05 to 20 g/10 min since superior moldability and mechanical properties are exhibited in injection molding, extrusion molding and the like. This melt flow rate is a value measured according to ASTM D1238 E. The ratio (Mw/Mn) of the weight average molecular weight (Mw) to the number average molecular weight (Mn), representing the molecular weight distribution of this poly(1-butene) resin is usually in the range of from 2 to 15, and particularly preferably in the range of from 3 to 8 since superior impact strength is exhibited.

The glass fiber (B) contained in the composition of the invention is of a kind generally used for the reinforcement of synthetic resins, etc., and not particularly limited. For example, roving, chopped strand, etc. are mentioned. Preferred among them is chopped strand since it has uniform dispersibility in the resin and higher strength-enhancing effect.

The fiber diameter of this glass fiber (B) is usually in the range of from 6 to 15 μm, preferably in the range of from 10 to 13 14μm.

The ratio of the poly(1-butene) resin (A)/the glass fiber (B) contained in the composition of the invention is from about 60/40 to 95/5 by weight ratio, and preferably the ratio is from about 65/35 to 80/20 since this ratio leads to poly(1-butene) resin composition excellent in the balance between rigidity and impact strength.

The modified propylenic resin (C) contained in the composition of the invention is a resin obtained by graft copolymerizing a graft monomer with a propylenic polymer.

This propylenic polymer is a homopolymer of propylene; a block copolymer of propylene with 50 mole % or less of one or two or more of other α-olefins usually having 2 to 20 carbon atoms such as, for example, ethylene, 1-butene, 1-hexene, 4-methyl-1-pentene, 1-octene, 1-decene and 1-tetradecene; or a random copolymer of crystalline propylene with 10 mole % or less of such cz-olefin(s). The propylene-α-olefin block copolymer also includes a so-called non-polymer blend type copolymer which is obtained by stepwise polymerizing olefins in the presence of a stereoregular polymerization catalyst and in one polymerization reaction system changing the monomer composition and wherein the individual polymers are not always copolymerized.

Further, examples of the graft monomer which may be contained in the modified propylenic resin (C) are unsaturated carboxylic acids such as maleic acid, maleic anhydride, acrylic acid, fumaric acid, tetrahydrophthalic acid, itaconic acid, citraconic acid and crotonic acid, and their derivatives.

The graft-modified rate of this modified propylenic resin (C), namely the content of the graft monomer in the modified propylenic resin (C) is usually in the range of from about 0.05 to 8 weight %, preferably in the range of from about 0.1 to 4 weight %.

This modified propylenic resin can be prepared by graft copolymerizing the propylenic polymer with the graft monomer(s) according to known processes. For example, there can be mentioned a process which comprises carrying out graft copolymerization by adding monomer(s) to the molten propylenic polymer, and a process which comprises carrying out graft copolymerizing by adding graft monomer(s) to the propylenic polymer dissolved in a solvent. In either process, in order to graft copolymerize the graft monomer(s) with the propylenic polymer effectively, the reaction is preferably carried out in the presence of a radical polymerization initiator. The temperature of this reaction is usually within the range of from about 60° to 350° C.

Examples of the radical polymerization initiator to be used are organic peroxides, organic perester compounds, azo compounds, etc.

Specific examples of organic peroxides are benzoyl peroxide, dichlorobenzyl peroxide, dicumyl peroxide, di-t-butyl peroxide, 2,5-dimethyl-2,5-di(peroxidebenzoate)hexyne-3, 1,4-bis(t-butylperoxyisopropyl)benzene, lauroyl peroxide, 2,5-dimethyl-2,5-di(t-butylperoxy)hexyne-3, 2,5-dimethyl-2,5-di(t-butylperoxy)-hexane, etc.

Specific examples of organic parester compounds are t-butyl perbenzoate, t-butyl peracetate, t-butyl perphenylacetate, t-butyl perisobutyrate, t-butyl per-sec-octoate, t-butyl perpivalate, cumyl perpivalate, t-butyl perdiethylacetate, etc.

Specific examples of azo compounds are azobisisobutyronitrile, dimethyl azoisobutyrate, etc.

These radical polymerization initiators can be used alone or in a combination of two or more.

Preferred among the radical polymerization initiators are dialkyl peroxide compounds such as dicumyl peroxide, di-t-butyl peroxide, 2,5-dimethyl-2,5-di(t-butylperoxy)hexyne-3, 2,5-dimethyl-2,5-di(t-butylperoxy)-hexane and 1,4-bis(t-butylperoxyisopropyl)-benzene.

The use ratio of this radical polymerization initiator(s) is usually in the range of from 0.001 to 1 weight part per 100 weight part of the propylenic polymer.

The content of the modified propylenic resin (C) in the composition of the invention is from about 0.1 to 10 weight parts per 100 weight parts of the poly(1-butene) resin (A) and the glass fiber (B), and preferably is from 0.5 to 5 weight parts. This combination results in a good balance of mechanical physical properties and long-term durability.

The composition of the invention may also contain antioxidant(s) usually added to polyolefins, in order to prevent oxidation. Examples of suitable antioxidant include phenolic, phosphorus series antioxidants, which can be used alone or in a combination of two or more.

Specific examples of these phenolic or phosphorus series antioxidants are 2,6-di-t-butyl-4-hydroxybenzoate, n-hexane, 3,5-di-t-butyl-4-hydroxybenzoate, 1,3,5-trimethyl-2,4,6-tris(3,5-di-t-butyl-4-hydroxybenzyl)benzene, 1,3,5-tris(t-butyl-3-hydroxy-2,6-dimethylphenyl) isocyanate, tris(3,5-di-t-butyl-4-hydroxyphenyl) isocyanate, n-octadecyl 3-(3,5-di-t-butyl-4-hydroxyphenyl)-propionate, nickel salt of bis(3,5-di-t-butyl-4-hydroxybenzoylphosphonicacid)monoethylester, 2,2'-dihydroxy-3,3'-di(α-methylcyclohexyl)-5,5'-dimethyldiphenylmethane, 4,4-thio-bis(b-methyl-6-t-butylphenol),1,1,3-tris(2-methyl-4-hydroxy-5-t-butylphenyl)butane, tetrakis[methylene-3-(3,5-di-t-butyl-4-hydroxyphenyl)propionate]methane, 2,6-di-t-butyl-p-cresol, 4,4'-methylene-bis(2,6-di-t-butyl-phenol), tris(2,5,di-t-butylphenyl)phosphite and vitamin E.

When the composition of the invention contains antioxidant(s), the antioxidant(s) content is usually in the range of from about 0.1 to 21.0 weight parts, preferably in the range of from about 0.5 to 1.8 weight parts per 100 weight parts of the total composition inclusive of (A), (B), and (C).

The composition of the invention may further contain in addition to the antioxidant(s), if necessary, additives such as an ultraviolet absorber, a fungicide, a rust inhibitor, a lubricant, a filler, a pigment and a heat resistant stabilizer in a range that does not adversely affect the objects of the invention.

Further, in order to improve the moldability or adjust the various physical properties, the inventive composition may contain an olefinic elastomer such as polyethylene or polystyrene in a range that does not adversely affect the objects of the invention. When such an olefinic elastomer is used, it is usually present in an amount of about 20 weight parts or less per 100 weight parts of the total composition inclusive of (A), (B), and (C).

The preparation of mechanical type joints for pipes using the composition of the invention can be carried out using conventional methods known in the art. For example, a process which comprises directly molding the joints by injection molding or a process which comprises molding round bars by extrusion molding or press molding and subjecting them to cutting work are suitable for the practice of this invention.

The following examples and table further detail the various aspects of this invention.

EXAMPLE 1

69 weight parts of a poly(1-butene) resins (P 1404 c produced by Mitsui Petrochemical Industries, Ltd.), 1 weight part of a maleic anhydride-modified polypropylene resin (the rate of modification with maleic anhydride: 3 weight %) and 30 weight parts of glass fiber (GRS-3A produced by Asahi Glass Fiber Co., Ltd., average fiber size: 13 μm, average fiber length: 3 mm) were mixed, melted and kneaded at a molding temperature of 200° C. using a biaxial extruder and injection molded by an injection molding machine (IS 50 produced by Toshiba Machine Co., Ltd.) to prepare specimens.

The obtained specimens were measured for tensile strength, tensile elongation percentage, bending strength, bending elastic modulus, Rockwell hardness (R scale), Izod impact strength, heat distortion temperature (18.5 Kgf/cm$^2$) and chlorine water resistance according to the following methods. The results are shown in Table 1.

COMPARATIVE EXAMPLE 1

The same poly(1-butene) resin as used in Example 1 was solely measured for tensile strength, tensile elongation percentage, bending strength, bending elastic modulus, Rockwell harness (R scale), Izod impact strength, heat distortion temperature (18.5 Kgf/cm$^2$) and chlorine water resistance, respectively in the same manner as in Example 1. The results are shown in Table 1.

COMPARATIVE EXAMPLES 2 to 4

The compositions prepared according to the compounding formulations shown in Table 1 were measured, in the same manner as in Example 1, for tensile strength, tensile elongation percentage, bending strength, bending elastic modulus, Rockwell harness (R scale), Izod impact strength, heat distortion temperature (18.5 Kgf/cm$^2$) and chlorine water resistance. The results are shown in Table 1. In comparative example 3, a polyacetal resin (Juracon M 90 produced by Polyplastics Co., Ltd.) was measured.

TABLE 1

| | | | EXAMPLE | COMPARATIVE EXAMPLE | | | |
|---|---|---|---|---|---|---|---|
| | | | 1 | 1 | 2 | 3 | 4 |
| Component | | | | | | | |
| Poly(1-butene) resin (A) | | weight % | 69 | 100 | 70 | | |
| Polypropylene | | weight % | | | | | 70 |
| Glass fiber (B) | | weight % | 30 | | 30 | | 30 |
| Maleic anhydride-modified polypropylene (C) | | weight % | 1 | | | | |
| Tensile strength | | (Kgf/cm$^2$) | 620 | 360 | 340 | 620 | 900 |
| Tensile elongation percentage | | (%) | 4 | 12 | 7 | 60 | 2 |
| Bending strength | | (Kg/cm$^2$) | 810 | 240 | 430 | 990 | 1200 |
| Bending elastic modulus | 23° C. | (Kg/cm$^2$) | 35000 | 7000 | 33000 | 29000 | 55000 |
| | 90° C. | (Kg/cm$^2$) | 23000 | 4200 | 21000 | | |
| | 100° C. | (Kg/cm$^2$) | | | | 7000 | 30000 |
| Rockwell hardness | | (R-scale) | 91 | 53 | 66 | 120 | 110 |
| Izod impact strength | | (Kg-cm/cm) | 12 | 28 | 26 | 8 | 9 |
| Heat distortion temperature | | (°C.) | 110 | 53 | 86 | 124 | 153 |
| Chlorine water resistance | | Deterioration time (week) | 9 | 10 | 9 | 3 | 5 |

Tensile strength and tensile elongation percentage: Measured according to JIS K7113
Bending strength and bending elastic modulus: Measured according to JIS K7203
Rockwell hardness: Measured according to JIS K7202
Izod impact strength: Measured according to JIS K7110
Heat distortion temperature: Measured according to ASTM K7207
Chlorine water resistance: A specimen of 10 mm × 150 mm was cut out from a press sheet 1 mm thick, attached to a retainer and immersed in a container through which chlorine-containing water having an effective chlorine concentration of 100 ppm and a temperature of 90° C. was flowed in a flow rate of 1 liter/hour, and the time before the surface of the specimen whitened was measured. Whitening is a phenomenon that indicates a deterioration of the resin surface due to the action of chlorine. As a consequence of whitening minute cracks are formed on the surface of the specimen, and the surface becomes whitish in appearance.

While this invention has been described in detail for the purpose of illustration, it is not to be construed as limited thereby but is intended to cover all changes and modifications within the spirit and scope thereof.

What is claimed is:

1. A poly(1-butene) resin composition comprising from about 60 to 95 weight parts of a poly(1-butene) resins (A), from about 5 to 40 weight parts of glass fiber (B) and a modified propylenic resin (C) present in an amount of from about 0.1 to 10 weight parts based on the combined weight parts of (A) and (B).

2. A composition as in claim 1 wherein said poly(1-butene) resin (A) is a homopolymer of 1-butene.

3. A composition as in claim 1 wherein said poly(1-butene) resin (A) is a copolymer of 1-butene and an α-olefin having 2 to 20 carbon atoms.

4. A composition as in claim 3 wherein said α-olefin is present in an amount of about 20 mole %.

5. A composition as in claim 3 wherein said α-olefin is present in an amount of about 10 mole %.

6. A composition as in claim 1 wherein said poly(1-butene) resin (A) has a ratio of its weight average molecular weight (Mw) to its number average molecular weight (Mn) in the range of from 2 to 15.

7. A composition as in claim 1 wherein said glass fiber (B) is chopped glass fiber having a diameter in the range of from 6 to 15 μm.

8. A composition as in claim 1 wherein the ratio of (A):(B) is from 65:35 to 80:20.

9. A composition as in claim 1 wherein said modified propylenic resin (C) is a homopolymer of propylene.

10. A composition as in claim 1 wherein said modified propylenic resin (C) is a block copolymer of propylene with about 50 mole % of at least one α-olefin having 2 to 20 carbon atoms.

11. A composition as in claim 1 wherein said modified propylenic resin (C) is a random copolymer of crystalline propylene with about 10 mole % of at least one α-olefin having 2 to 20 carbon atoms.

12. A composition as in claim 1 further comprising an antioxidant(s).

13. A composition as in claim 12 wherein said antioxidant(s) is present in an amount within the range of from 0.1 to 21 weight parts.

14. A composition as in claim 12 further comprising at least one additive selected from the group consisting of a UV absorber, a fungicide, a rust inhibitor, a lubricant, a filler, a pigment, or a heat resistant stabilizer.

15. A composition as in claim 14 further comprising an olefinic elastomer.

16. A shaped article of manufacture produced from the composition of claim 15.

17. A shaped article of manufacture produced from the composition of claim 1.

* * * * *